United States Patent [19]
Deacon

[11] Patent Number: 5,991,899
[45] Date of Patent: Nov. 23, 1999

[54] METHOD AND APPARATUS FOR A REAL-TIME DIAGNOSTIC TOOL USING A NON-INTRUSIVE TRACE TECHNIQUE

[75] Inventor: Michael Deacon, Campbell, Calif.

[73] Assignee: Samsung Electronics Co., Ltd., Suwon, Rep. of Korea

[21] Appl. No.: 08/821,831

[22] Filed: Mar. 21, 1997

[51] Int. Cl.[6] .................................................. G06F 11/25
[52] U.S. Cl. ............................................. 714/37; 714/724
[58] Field of Search ........................ 395/183.13, 183.15, 395/183.14, 183.16, 183.21, 183.06, 183.03, 183.01; 371/22.1, 22.6, 27.5, 22.2

[56] References Cited

U.S. PATENT DOCUMENTS

| | | | |
|---|---|---|---|
| 4,183,459 | 1/1980 | Donn ................................. | 395/185.02 |
| 4,315,313 | 2/1982 | Armstrong et al. ............... | 395/183.21 |
| 4,752,928 | 6/1988 | Chapman et al. ................. | 395/183.15 |
| 4,876,685 | 10/1989 | Rich ................................... | 395/183.21 |
| 5,051,944 | 9/1991 | Fetterolf et al. ................... | 395/184.01 |
| 5,136,590 | 8/1992 | Polstra et al. ..................... | 395/183.05 |
| 5,263,143 | 11/1993 | Robinson et al. .................. | 371/21.1 |
| 5,630,048 | 5/1997 | La Joie et al. .................... | 395/183.01 |
| 5,724,505 | 3/1998 | Argade et al. ..................... | 395/183.21 |
| 5,748,878 | 5/1998 | Rees et al. ......................... | 395/183.14 |
| 5,764,952 | 6/1998 | Hill ..................................... | 395/183.13 |

Primary Examiner—Robert W. Beausoliel, Jr.
Assistant Examiner—Scott T. Baderman
Attorney, Agent, or Firm—Kenneth L. Sherman, Esq.; Sherman & Sherman

[57] ABSTRACT

A diagnostic tool includes a self-contained mechanism to queue, buffer, and transmit tracing information, written to a prescribed address in the address space of a computer system, to a serial port without burdening the computer system. In addition, general purpose outputs are provided for use with logic analyzers and oscilloscopes, and the prescribed address is configurable with switches.

13 Claims, 5 Drawing Sheets

METHOD AND APPARATUS FOR A REAL-TIME DIAGNOSTIC TOOL USING A NON-INTRUSIVE TRACE TECHNIQUE

TECHNICAL FIELD

The invention relates generally to diagnostic tools for computer systems and more particularly to real-time, non-intrusive tracing tools.

BACKGROUND ART

No non-trivial software program is written the first time without errors. The process of finding and fixing the errors in a software program is known as debugging because such errors are commonly called bugs.

There are four phases in a software development program. In the first phase, the specifications for the software product are determined and the software is designed to meet those specifications. In the second phase, or coding phase, source code for the software is written in a high-level computer language, such as the "C" programming language. The source code is compiled into an executable program, consisting of low-level assembly language instructions.

During the third, or testing, phase, the program is tested by executing the program repeatedly for a variety of inputs. Finally in the fourth phase, errors in the behavior of the program must be diagnosed and fixed. This debugging phase of a software development project poses a great management challenge because it is often difficult to predict how much time and effort it may take to find a particular bug. Accordingly, there is a strong need for good tools to diagnose software bugs.

A common tool for diagnosing software errors is a source code debugger. A source code debugger allows the software developer to step through an execution of a program line-by-line in the source code. While a developer is stepping through a program, the source code debugger stops and starts the execution of the program. When the execution of the program has stopped on a line of the program, the developer can determine information about the state of the execution of the program, such as which subroutine of the program is executing and what values the program's variables are currently holding.

If the developer needs to trace through a section of code in which the source code is not or was never available, then the developer uses an assembly language debugger, which can also be a feature of a source code debugger. An assembly language debugger allows the developer to stop and restart the execution of the program at any machine level instruction and inspect the contents of machine registers and memory locations.

Both source code debuggers and assembly language debuggers are capable of diagnosing a large number of errors, but they are not so useful for finding certain kinds of bugs. In particular, they do not work well for software written for real-time systems.

In a real-time system, the timing of the events occurring in the system is critical. For example, race conditions can be a source of pernicious bugs. A race condition occurs when there are two signals occurring asynchronously around the same time in which the behavior of the program is dependent on the order in which those signals occur. However, a source level debugger or an assembly level debugger operates by stopping the execution of a program. As a result, the race condition may disappear because one of the components producing a signal is delayed by the debugger so that one signal always occurs after the other signal.

One approach to debugging race conditions is to put a probe of a logic analyzer or oscilloscope on a hardware component that carries the signal under consideration. In this manner, the developer can determine the exact timing of the signals without affecting the timing characteristics of the program, which is not feasible during a session with a source code or assembly language debugger.

A drawback to the use of logic analyzers and oscilloscopes is that they provide information only about the operating characteristics of the computer hardware, not the software. For many bugs, it is useful to know the current state of the execution of the program when signals occur. As a result, programmers embed statements in their software to output state information, usually in the form of text strings to an existing port of the computer system for transmission to a monitoring device, such as a diagnostic computer.

However, there are a number of disadvantages in using an existing port for outputting debugging information. As one example, the existing port was originally intended to provide some functionality to the computer. It may be difficult, if not impossible, to share that port for its original purpose and for debugging.

Another disadvantage with using an existing port is that the use is intrusive. This is because the port must output the debugging data in real time, stealing processing time away from the computer system. Typically, to use an existing port, the debugging information is queued to a device driver. The device driver operates under interrupt control and thus will temporarily stop the execution of the program to output the queued debugging information. However, even temporarily stopping the execution can sufficiently perturb the timing characteristics of the program to make diagnosing a race condition impossible.

Furthermore, an existing port usually operates more slowly than the main processor executing the computer program being debugged. Thus, the device driver for the port needs to store debugging information in a buffer, reducing the amount of available memory for the program. Some programs have no memory left to spare.

Therefore, there is a need for a non-intrusive diagnostic tool that can provide information about the operating characteristics of the computer software.

DISCLOSURE OF THE INVENTION

According to the present invention, the foregoing and other objects and advantages are attained by a diagnostic tool for attaching to a bus carrying a write enable bit, address bits, and data bits. The diagnostic tool has a serial port and a probe arrangement for accessing the bus to detect a number of bits. The diagnostic tool has control logic to output a write enable signal based on the write enable bit, address logic to output an address signal indicating whether the address bits match a prescribed address, and data logic to output the data bits as a data word. The diagnostic tool also has serial interface logic to buffer the data word in response to write enable signal and address signal and to output the buffered data word to the serial port.

As another aspect, the address logic has switches, address enable logic, and an address decoder to output the address enable signal based on the address bits and the switches.

As yet another aspect, the serial interface logic comprises a memory and buffer logic for buffering the data word in response to the write enable signal and the address signal. In addition, the serial interface logic includes a serial output device for outputting the buffered data word to the serial port.

According to another aspect of the invention, the diagnostic, tool further comprises general purpose interface logic for latching the data word in response to the write enable signal and address signal. The general purpose interface is also configured for outputting the latched data word to output pins.

The diagnostic tool thus performs a non-intrusive trace of a real-time system by outputting debugging information to a new serial port without stealing time or memory away from the host computer.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

The present invention is illustrated by way of example, and not by way of limitation, in the figures of the accompanying drawings and in which like reference numerals refer to similar elements.

BEST MODE FOR CARRVINC OUT THE INVENTION

A diagnostic apparatus for a non-intrusive trace is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

INDEPENDENT SERIAL OUTPUT SUBSYSTEM

The diagnostic tool achieves a non-intrusive trace of a target computer system by providing an independent serial output subsystem that does not interrupt the target processor or consume the memory of the target.

Figure 1:
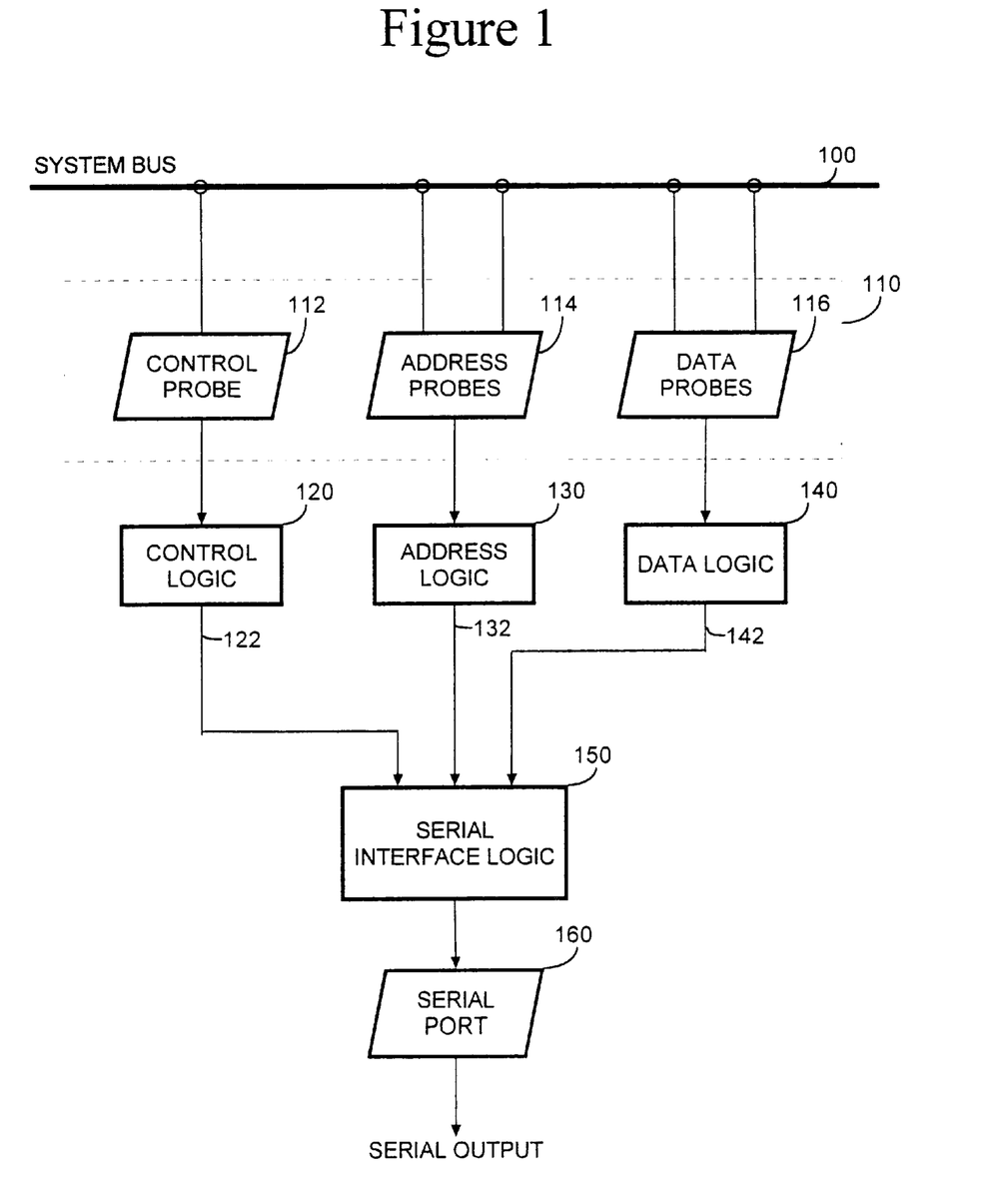
FIG. 1 is a high level diagram of an embodiment of the present invention.

Referring to FIG. 1, an embodiment of the invention comprises probe arrangement 110, coupled to control logic 120, address logic 130, and data logic 140. Control logic 120, address logic 130, and data logic 140 are coupled to serial interface logic 150, which is coupled to serial port 160.

Probe arrangement 110 contains releasably attachable probes for coupling to system bus 100, which carries a write enable bit, address bits, and data bits. Specifically, probe arrangement 110 has control probe 112 for detecting the write enable bit, address probes 114 for detecting the address bits, and data probes 116 for detecting the data bits. A probe can be a compression clip, a footprint-specific integrated circuit clip, or any other probe suitable for forming a temporary electrical connection to a pin on system bus 100.

In the normal course of use, control probe 112 is attached to lines of the system bus carrying control signals, especially a write enable bit. Address probes 114 are attached to the several lines carrying the address bits on the system bus. Likewise data probes 116 are attached to the several lines carrying the data bits on the system bus. By attaching to the system bus in this manner, the diagnostic tool appears like any other device on the system bus to the central processor of the computer system. In other words, the central processor writes data bits to the diagnostic tool by setting the address bits to a prescribed value and enabling the write enable bit.

Control probe 112, address probes 114, and data probes 116 are coupled to control logic 120, address logic 130, and data logic 140, respectively. Control logic 120 detects the presence of the write enable bit on the system bus, through control probes 112, and outputs write enable signal 122, indicating that the central processor is attempting a write operation to a device on the system bus.

Address logic 130 determines whether an address, indicated by the address bits currently on the system bus through address probes 114, is set to a prescribed address for the diagnostic tool. The particular prescribed address can be any address in the address space of the central processor that is not in use and likely to not be in use during an execution of a program under diagnosis. The output of address logic 130 is address signal 132, which identifies a particular diagnostic function of the diagnostic tool, when the address bits on the system are set to a prescribed address. On the other hand, when the address bits are not set to the prescribed address, address signal 132 does not identify any particular diagnostic function. For example, A prescribed address for the serial output function of the diagnostic tool may be 0xC0000000 in hexadecimal notation. Accordingly, a write to address 0xC0000000 in the address space of the central process produces, by means of address logic 130, address signal 132 identifying serial interface logic 150. If the address written to is not 0xC0000000, then address signal 132 does not identify serial interface logic 150.

Data logic 140 is a standard buffer which holds the data bits, detected by data probes 116 on the system bus, so that the diagnostic tool can use the data bits as data word 142 without loading the system bus.

Serial interface logic 150 receives write enable signal 122, address signal 132, and data word 142. If write enable signal 122 is not enabled, then serial interface logic 150 does nothing with the other inputs. Likewise, if address signal 132 does not identify the serial output function of the diagnostic tool, then serial interface logic 150 does nothing with the other inputs.

However, if write enable signal 122 is enabled and address signal 132 identifies the serial output function, then serial interface logic 150 sends data word 142 as serial output through serial port 160. Serial port 160 can be any industry standard, RS-232 compliant port, such as a DB-9 COM port, standard to personal computers.

DEBUGGING WITH THE NON-INTRUSIVE TRACE

Thus configured, the diagnostic tool according to an embodiment of the invention is operated for debugging in the following manner. If a programmer desires to find when a function in the program is executed, the programmer embeds statements in the source code at the beginning and end of the function to output debugging information that the function is executed. The statements direct the central processor to repeatedly write successive characters of a textual string containing the debugging information to a prescribed address in the addressing space of the central processor.

After the statements are embedded, the source code is compiled into an executable program. Before executing the program, the developer attaches control probe 112, address probes 114, and data probes 116 to the appropriate portion of the system bus, as described above. When the program is executed and when the target function is reached, the embedded statements repeatedly write successive characters of a string to the prescribed address. As a result, control logic 120 and address logic 130 detect each write to the prescribed address and cause the character captured by data logic 140 to be transmitted through serial output 160 by serial interface logic 150.

TABLE 1

```
#define SERIAL_OUT ((char *) 0xC0000000)
void db (register const char *s)
{
    while (*SERIAL_OUT = *s++)
}
void func()
{
    db ("ENTER func()");
    /* Some code goes here */
    db("EXIT func()");
}
```

For example, Table 1 shows sample source code for a target function, func, written in the "C" programming language. Embedded at the beginning of the target function is a statement to send the string "ENTER func ( )" through the serial port of the diagnostic tool. In this case, the statement is a call to a function called db, which has a tight while-loop to repeatedly send each character of the string to a prescribed address of the diagnostic tool, in this example, 0xC0000000. At the end of the function is a similar statement to send the string "EXIT funco ( )" through the serial port. In this manner, the developer is able to output debugging information without having to interrupt the central processor, because the diagnostic tool, not the central processor, queues, buffers, and outputs the debugging information through its own serial port.

BUFFERED SERIAL OUTPUT

Since a central processor may queue data words to the diagnostic tool faster than the data words are transmitted through serial port 150, an embodiment of the invention buffers the incoming data words. Accordingly, with reference to FIG. 2, serial interface logic 150 comprises buffer logic 200, memory 202, and serial output device 204.

Figure 2:
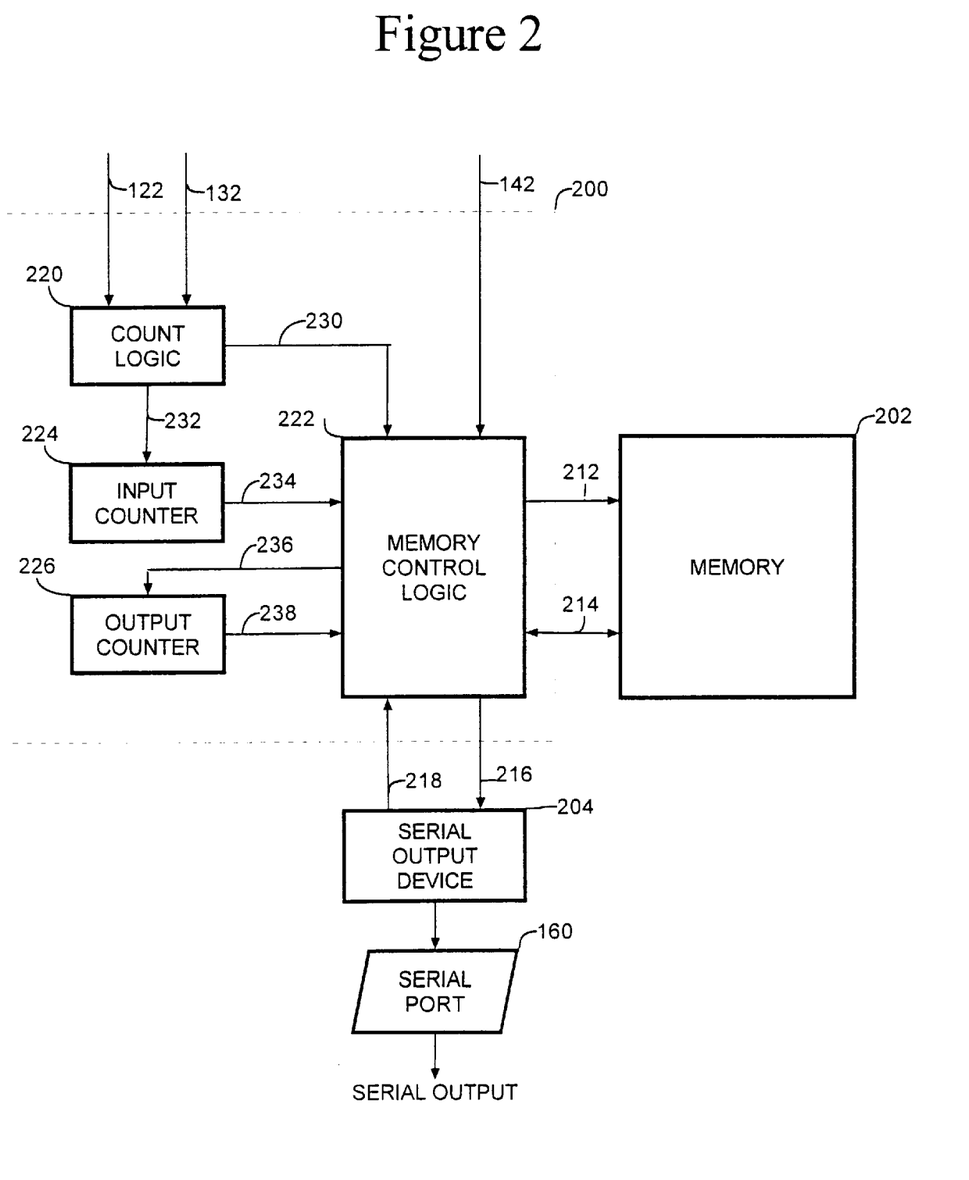
FIG. 2 is a block diagram of serial interface logic according to an embodiment of the invention.

Buffer logic 200 stores data word 142 in memory 202 in response to write enable signal 122 being enabled and address signal 132 identifying a serial output function. To store data word 142 in memory 202, buffer logic 200 puts data word 142 on memory data line 214 and sets memory control signal 212 specific to the kind of memory being employed. Various kinds of memory are well-known in the art, as well as generating the required signals. For example, memory 202 can be implemented as a random access memory (RAM), wherein memory control signal 212 comprises a memory address and a memory write enable signal. If memory 202 is implemented as a first-in-first-out serial memory (FIFO), then memory control signal 212 comprises a shift-in signal. Other equivalent kinds of memory may also be used.

Buffer logic 200, in response to buffer read signal 218, fetches a stored data word from memory 202 through memory line 214 using memory control signal 212. Again, memory control signal 212 used to retrieve a data word from memory 202 is specific to the kind of memory being employed. For example, if memory 202 is a FIFO, then memory control 212 is a shift-out signal. If, however, memory 202 is a RAM, then memory control signal 212 comprises a memory address and a memory read enable signal. In such a case, the memory address in memory control signal 212 is the memory address of the earliest stored data word that has not yet been fetched.

After buffer logic 200 fetches the stored data word from memory 202 in response to buffer read signal 218, the stored data word is output to serial output device 204 as buffered data word 216. Serial output device 204 repeatedly sends buffer read signal 218 to obtain buffered data word 216 until there are no more buffered data words left. After receiving buffered data word 218, serial output device 204 sends buffered data word 218 to serial port 160. The implementation of serial output device 204 is well-known in the art. In a preferred embodiment, serial output device 204 is implemented with a UART (universal asynchronous receiver-transmitter).

RING BUFFER

According to the preferred embodiment, memory 202 is implemented as a RAM, and the implementation of buffer logic 200 for RAM memory 202 is a ring buffer, further shown in FIG. 2. Buffer logic 200 comprises count logic 220, memory control logic 222, input counter 224, and output counter 226.

Count logic 220 receives write enable signal 122 and address signal 132. If write enable signal 122 is enabled and address signal 132 identifies a serial output function, then count logic 220 outputs buffer write signal 230 and input counter signal 232.

Input counter 224 maintains memory input address 234, provided to memory control logic 222, and changes memory input address 234 by a unit in response to input counter signal 232. In other words, input counter 224 is configured to either repeatedly increment or repeatedly decrement memory address 234 in response to input counter signal 232. Similarly, output counter 226 maintains memory output address 238, provided to memory control logic 222, and changes memory output address 238 by a unit in response to memory output signal 236. Output counter 226 changes memory output address 238 by the same unit as input counter 224.

In response to buffer write signal 230, memory control logic 222 transfers data word 142 to memory data line 214 using memory input address 234 to form memory control signal 212. As a result, data word 142 is stored in memory 202 at memory input address 234. In response to buffer read signal 218, memory control logic 222 sends memory 202 memory control signal 222 based on memory output address 238. In response, memory 202 provides a stored data word to memory data line 214, which memory control logic transfers as buffered data word 216 to serial output device 204.

Memory control logic 222 may be implemented by any well-known technique in the art, such as with sequential logic or a microprocessor. In the preferred embodiment, a microcontroller is used.

GENERAL PURPOSE OUTPUTS

Figure 3:
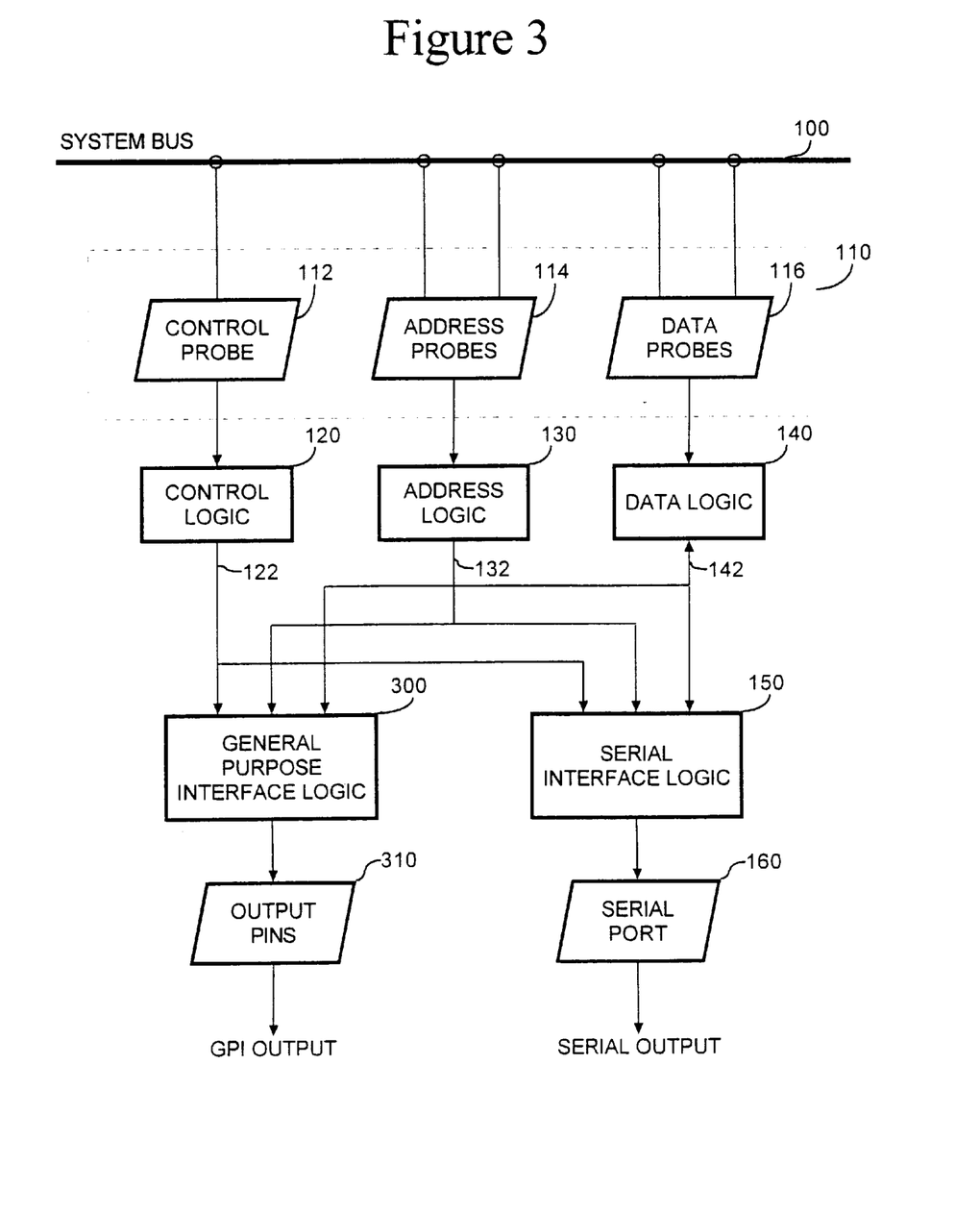
FIG. 3 is a high level diagram of another embodiment of the present invention.

According to another aspect of the preferred embodiment, additional debugging information about the software state of an executing program is supplied to general purpose outputs. A general purpose output is a pin which carries a TTL or CMOS signal and thus can be read with a logical analyzer or an oscilloscope. Referring to FIG. 3, this embodiment further comprises general purpose interface logic 300 and general purpose outputs 310.

General purpose logic 300 is coupled to control logic 120, address logic 130, and data logic 140. Data logic 140 are further configured to place data word 142 on the system bus in response to a read request from the central processor.

In addition, address logic 130 is further configured to produce address signal 132 which discriminates the function of the diagnostic tool, either serial interface logic 150 or general purpose interface logic 300, and the set of general purpose outputs, based on successive prescribed addresses. For example, a prescribed address for serial interface logic 150 may be set to 0xC0000000, and the prescribed address for the first set of general purpose outputs is then set at the next address, 0xC0000001. Second and third sets of general purpose outputs would correspond to addresses 0xC0000002 and 0xC0000003, respectively.

Figure 4:
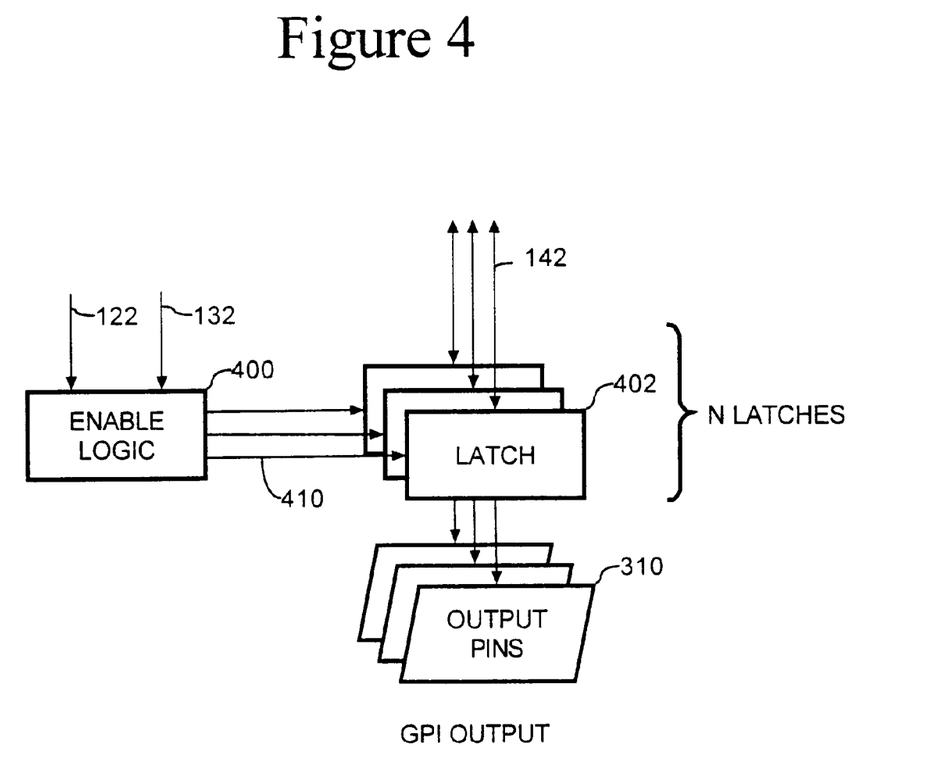
FIG. 4 is a block diagram of general purpose interface logic according to another embodiment of the invention.

Referring to FIG. 4, general purpose interface logic 300 comprises enable logic 400 and a number of latches of which latch 402 is representative. Enable logic 400 receives write enable signal 122 and address signal 132. If write enable signal 122 is enabled and address signal 132 identifies a latch, then enable logic 400 transmits latch enable signal 410 to a latch. If representative latch 402 is thus identified, then latch enable signal 410 will cause latch 402 to store data word 142 for output to general purpose output pins 310.

In this manner, an executing program can indicate debugging information by setting or clearing a single bit at a general purpose output pin, monitored by a logic analyzer or an oscilloscope. For example, in the previous example shown in Table 1 it may be desired instead to indicate that function func is executing by using a general purpose output.

Accordingly, the programmer designates a general purpose output pin on the diagnostic tool to signify that function func is executing. In this example, the second pin of the third set of general purpose outputs is so designated. Knowing the designated pin, the programmer embeds a statement at the beginning of the program to set high that pin. Likewise, a statement to set that pin low is embedded at the end of the program. Table 2 shows sample "C" source code to accomplish those actions.

TABLE 2

```
#define GPI_OUT3 ((char *) 0xC0000004)
void func()
{
    *GPI_OUT3 | = 0x02;
    /* Normal code for func() goes here. */
    *GPI_OUT3 &= ~0x02;
}
```

The first embedded statement, *GPI_OUT3 |=0x02;, reads the value of third latch, sets the second bit with a standard bitwise-or operator, and writes the value back to the third latch. As a result, the second pin of the third set of general purpose outputs attains a "high" voltage level. The second embedded statement, *GPI_OUT3 &=~0x02;, reads the value of the third latch, clears the second bit with a standard bitwise-and operator, and writes the value back to the third latch. As a result, the same second pin of the third set of general purpose outputs attains a "low" voltage level.

In this manner, a programmer can provide information as a general purpose output about the state of an executing program to a logic analyzer or oscilloscope. This way of providing information to a logic analyzer is particularly useful in comparing the timing of a hardware signal to the existence of a software state. Furthermore, setting bits on general purpose output pins 310 is faster than serially writing successive bytes of a debugging string, affecting to a lesser degree the timing characteristics of the program.

CONFIGURABLE ADDRESSES

Figure 5:
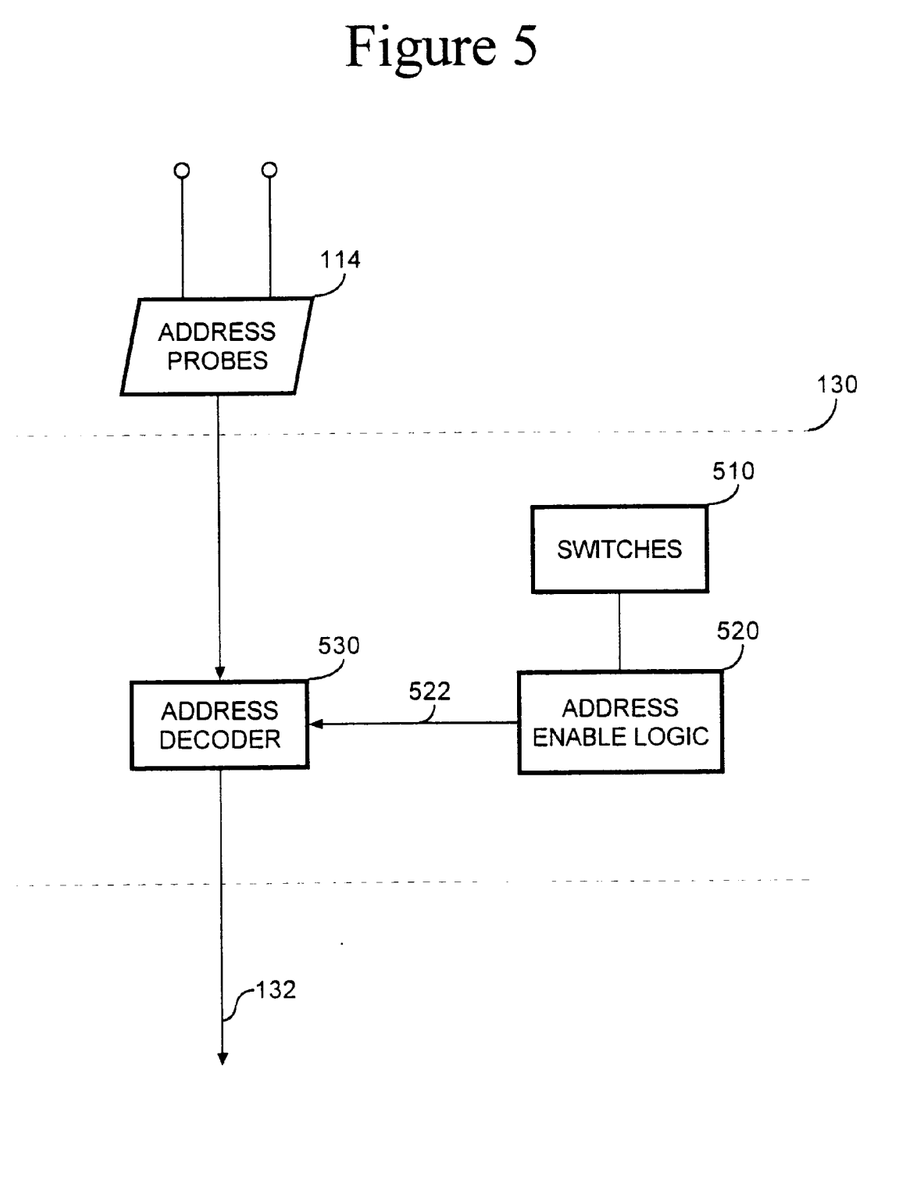
FIG. 5 is a block diagram of address logic according to an embodiment of the invention.

According to another aspect of the preferred embodiment, the diagnostic tool is configurable to use any address in the address space as the prescribed address. To accomplish this feature, address logic 130 further comprises switches 510, address enable logic 520, and address decoder 530.

Address decoder 530 is a standard, off-the-shelf part that is well-known in the art. Switches 510, which can be implemented with DIP switches, are set to prescribe an address in the address space of the central processor. Address enable logic 520 receives the settings of switches 510 and provides an appropriate address enable signal 522 to address decoder 530.

In response to address bits received from address probes 114 and address enable signal 522, address decoder 530 produces address signal 132 that identifies which one of successive prescribed addresses are designated by the address bits.

In this manner, the diagnostic tool can be used on a variety of computer systems, regardless of the particular configuration and use of the address space of the central processor of each computer system.

In this disclosure there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. A diagnostic tool for attaching to a bus carrying a write enable bit, a plurality of address bits, and a plurality of data bits, said diagnostic tool comprising:

a serial port;

a probe arrangement releasably couplable to access said bus for detecting a plurality of bits;

control logic coupled to said probe arrangement and configured for outputting a write enable signal based on the write enable bit;

address logic coupled to said probe arrangement and configured for outputting an address signal indicating whether the plurality of address bits matches a prescribed address, wherein said address logic further comprises;

a plurality of switches;

address enable logic coupled to said plurality of switches and configured for outputting an address enable signal based on said plurality of switches signifying the prescribed address; and an address decoder coupled to said address enable logic and configured for outputting the address signal indicating whether the plurality of address bits matches the prescribed address signified by the address enable signal;

data logic coupled to said probe arrangement and configured for outputting the plurality of data bits as a data word; and serial interface logic coupled to said control logic, said address logic and said data logic and configured for buffering the data word in response to the write enable signal and the address signal ad outputting the buffered data word to said serial port.

2. The diagnostic tool of claim 1, wherein said probe arrangement comprises a compression clip.

3. The diagnostic tool of claim 1, wherein said probe arrangement comprises a footprint specific integrated circuit clip.

4. The diagnostic tool of claim 1, wherein said plurality of switches comprises a DIP switch.

5. The diagnostic tool of claim 1, wherein said serial interface logic further comprises:

a memory for storing a word at one of a plurality of memory addresses;

buffer logic coupled to said control logic, said address logic, said data logic and said memory and configured for storing the data word in said memory at an input memory address in response to the write enable signal and address signal, retrieving a stored data word from said memory at an output memory address in response to a buffer read signal, and outputting the stored data word as a buffered data word; and a serial output device coupled to said buffer logic and configured for outputting a buffer read signal and outputting the buffered data word to the serial port.

6. The diagnostic tool of claim 5, wherein said buffer logic comprises:

count logic coupled to said control logic and address logic and configured for outputting a input counter signal and a buffer write enable signal in response to the write enable signal and the address signal;

an input counter coupled to said count logic and configured for changing the input memory address by a unit in response to the input counter signal;

memory control logic, coupled to said data logic, said count logic and said input counter and configured for storing the data word in said memory at the input memory address in response to the buffer write enable signal, outputting an output counter signal in response to the buffer read signal, and retrieving the stored data word from said memory at the output memory address in response to the buffer read signal; and an output counter, coupled to said memory control logic and configured for changing the output memory address by the unit in response to the output counter signal.

7. The diagnostic tool of claim 6, wherein said unit is a positive integer.

8. The diagnostic tool of claim 6, wherein said unit is a negative integer.

9. The diagnostic tool of claim 5, wherein said serial output device comprises a UART.

10. The diagnostic tool of claim 1, further comprising general purpose interface logic coupled to said control logic, said address logic and said data logic and configured for latching the data word in response to the write enable signal and the address signal and outputting the latched data word to a plurality of output pins.

11. The diagnostic tool of claim 10, wherein said general purpose interface logic further comprises:

latch enable logic coupled to said control logic and said address logic and configured for outputting a latch enable signal in response to the write enable signal and address signal; and a latch coupled to said latch enable logic and said data logic and configured for latching the data word in response to the latch enable signal and outputting the latched data word to said plurality of pins.

12. A diagnostic tool for attaching to a bus carrying a write enable bit, a plurality of address bits, and a plurality of data bits, said diagnostic tool comprising:

a probe arrangement releasably couplable to access said bus for detecting a pluraity of bits;

control logic coupled to said probe arrangement and configured for outputting an address signal indicating whether the plurality of address bits matches a prescribed address;

address logic coupled to said probe arrangement and configured for outputting an address signal indicating whether the plurality of address bits matches a prescribed address, wherein said address logic furter comprises:

a plurality of switches;

address enable logic coupled to said plurality of switches and configured for outputting an address enable signal based on said plurality of switches signifying the prescribed address;

an address decoder coupled to said address enable logic and configured for outputting the address signal indicating whether the plurality of address bits matches the prescribed address signified by the address enable signal; and data logic coupled to said probe arrangement and configured for outputting the plurality of data bits as a data word.

13. The diagnostic tool of claim 12, wherein said plurality of switches comprises a DIP switch.

* * * * *